(12) United States Patent
Nithi et al.

(10) Patent No.: US 7,492,725 B2
(45) Date of Patent: Feb. 17, 2009

(54) SYSTEM AND METHOD FOR REDUCING SWITCHING OVERHEAD IN A COMMUNICATION NETWORK

(75) Inventors: Nachi K. Nithi, Wayne, NJ (US); Carl J. Nuzman, Union, NJ (US); Benjamin Y. C. Tang, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 728 days.

(21) Appl. No.: 11/000,182

(22) Filed: Nov. 30, 2004

(65) Prior Publication Data

US 2006/0114829 A1     Jun. 1, 2006

(51) Int. Cl.
*H04L 12/28* (2006.01)
(52) U.S. Cl. ..................................................... 370/254
(58) Field of Classification Search ................ None
See application file for complete search history.

(56) References Cited

U.S. PATENT DOCUMENTS

| | | | | |
|---|---|---|---|---|
| 7,162,017 | B1 * | 1/2007 | Tobin et al. | 379/112.05 |
| 2003/0158765 | A1 * | 8/2003 | Ngi et al. | 705/7 |
| 2005/0065805 | A1 * | 3/2005 | Moharram | 705/1 |

OTHER PUBLICATIONS

Nuzman et al, Minimizing Switching Overhead in Central Office, Bell Labs, pp. 1-2, Mar. 2004.*
Nithi et al, Network Capacity Recovery and Efficient Capacity Deployment in Switching Centers, Bell Labs, pp. 83-100, 2005.*
Jones, et al., "Equality Set Projection: A new algorithm for the projection of polytopes in halfspace representation," CUED/F-INFENG/TR.463 Mar. 15, 2004; pp. 1-44.
Saran, et al., "Finding k Cuts Within Twice the Optimal," SIAM J. Computing, Feb. 1995, pp. 101-108.
Acharya, et al., "Architecting Self-Tuning Optical Networks," European Conference on Optical Communications (ECOC), Copenhagen, Sep. 2002, 2 pg.
Asghar, et al., "iOptimize: A Service for Analyzing and Optimizing Connection-Oriented Data Networks in Real Time," Bell Labs Tech. Journal, 2004, pp. 1-25.
Kernighan, et al., "An Efficient Heuristic for Partitioning Graphs," Bell Systems Tech. Journal, 1969, pp. 291-308, pp. 291-307.
Goldschmidt, et al., "A Polynomial Algorithm for the Kappa-Cut Problem for Fixed Kappa," Mathematics of Operations Research, Feb. 1994, pp. 24-37.

* cited by examiner

*Primary Examiner*—Frank Duong

(57) ABSTRACT

A system and method for reducing switching overhead in a communication network and a web-based server incorporating the system or the method. In one embodiment, the system includes: (1) an optimization engine configured to receive input data describing trunks, switches and traffic demands in at least a portion of the communication network and arrange connections between the trunks and switches such that the traffic demands are satisfied and such that a switch load or cost is reduced and (2) a report generator associated with the optimization engine and configured to produce a report containing a modified configuration having the reduced switch load or cost.

6 Claims, 4 Drawing Sheets ly of the communication network and a portion thereof.

SYSTEM AND METHOD FOR REDUCING SWITCHING OVERHEAD IN A COMMUNICATION NETWORK

TECHNICAL FIELD OF THE INVENTION

The present invention is directed, in general, to communications networks and, more specifically, to a system and method for reducing switching overhead in a communication network or a portion thereof.

BACKGROUND OF THE INVENTION

Network optimization has always been an important part of the business of building and upgrading communication networks. In a capacity deployment scenario, the network operator would like to minimize capital and operating expenses, while satisfying capacity and quality of service requirements. Capacity recovery services take the complementary approach of performing network optimization as part of the maintenance of an existing communication network. Here, the capital infrastructure is constrained, and the goal is to increase, and preferably maximize, the communication capacity and quality of service within the existing network.

On the face of it, capacity recovery and capacity deployment services could be seen as competing, since a successful capacity recovery service could postpone a network provider's need for new equipment. However, they should more properly be seen as complementary and synergistic. Capacity recovery provides a beneficial service to network providers who are unable or unwilling to make significant capital purchases. Common optimization tools and expertise can be applied for capacity recovery and capacity deployment, increasing the customers' confidence that they are receiving the greatest possible return on their capital and operational investment.

Network optimization can be performed network-wide, or with respect to a particular central office (CO) in the network. In a theoretical CO, a single switch is used to route information flows that pass between or among external trunks linking the CO to the remainder of a communication network. In a real CO, however, the number of trunks and the aggregate traffic load are often higher than the capacity of any single switch. Thus, the CO must contain multiple switches coupled to one another by internal trunks. The multiple switches in a particular CO are collectively termed a "switching center."

If the traffic patterns are dynamic and unpredictable, multiple switches can be arranged into non-blocking configurations capable of handling arbitrary permutations of demands. In many cases however, the aggregate flows between external trunks are static, or are expected to satisfy fairly tight static bounds. In such cases, it is sufficient and much less expensive to design the configuration of a CO only to satisfy a given static demand pattern.

Although geography and rights of way constrain the physical configuration of a wide area communication network and therefore make it expensive to change, the internal configuration of a CO may be designed relatively freely and inexpensively. Thus, the configuration of a CO can be the subject of optimization. The CO configuration problem may have a number of optimization objectives, including capital expenses, operating expenses and "switching load" (which is the total amount of traffic observed by all switches in a given CO). Of these, switching load has historically received the least attention.

Switching load has two components: fundamental load, which is the set of flows between external trunks, and overhead, which is twice the sum of all traffic flowing between local switches on internal trunks. Reducing the overhead almost certainly reduces the cost of equipment required.

A very simple form of this problem is equivalent to the well known "min k-cut" problem in graph theory. Suppose that a given CO has N external trunks, that $t_{i,j} > 0$ represents the aggregate demand between trunks i and j, and that the CO should use k switches. The task is to assign trunks having as much traffic as possible in common onto the same switch such that the flow between the switches is minimized. According to the min k-cut problem, the trunks are identified with the vertices of a fully connected graph, where a cost $t_{i,j}$ is associated with edge (i,j). The min k-cut problem seeks to cut the graph into k parts, in such a way that the total weight of the edges in the cut is minimized. Unfortunately, the min k-cut problem is NP-hard with respect to k and N, making it impractical for analyzing most real COs.

If k is fixed, it is polynomial in N (see, e.g., Goldschmidt, et al., "A Polynomial Algorithm for the Kappa-Cut Problem for Fixed Kappa," Mathematics of Operations Research, (1994), pp. 24-37, incorporated herein by reference). Relatively simple 2-approximations to the problem for fixed k exist (see, e.g., Saran, et al., "Finding k-cuts Within Twice the Optimal," SIAM J. Computing, (1995), pp. 101-108, incorporated herein by reference). Unfortunately, the known 2-approximations leave out switch constraints, which are the very reason that a CO needs multiple switches in the first place.

The simplest useful constraint is to limit the number of trunks that can be assigned to any switch, or equivalently to limit the cardinality of the connected components of the k-cut. A relatively efficient "swap" heuristic for this problem was developed in Kernighan, et al., "An Efficient Heuristic for Partitioning Graphs," Bell Systems Tech. J. (1970), pp. 291-308, incorporated herein by reference. Unfortunately, limiting the number of trunks that can be assigned to a switch is only one of many constraints that may be encountered in deciding upon the proper configuration of a CO, which limits the the utility of Kernighan's heuristic.

What is needed in the art is a system for improving the configuration of a switching center. The system could be used to design new networks, avoiding under- or over-engineering the network. Ignoring the overheads that necessarily arise for internal trunks would lead to optimistic estimates of cost and switching load. On the other hand, in the absence of an optimization system, a tendency exists to make overly conservative estimates using rules of thumb. Secondly, the system could be used to improve the performance of existing switching centers as part of a capacity recovery effort. If the degree of improvement is sufficient, the changes would be economically justified. What is further needed in the art is a method for reducing switching overhead in a CO of a communication network.

SUMMARY OF THE INVENTION

To address the above-discussed deficiencies of the prior art, the present invention provides a system for reducing switching overhead in a communication network. In one embodiment, the system includes: (1) an optimization engine configured to receive input data describing trunks, switches and traffic demands in at least a portion of the communication network and arrange connections between the trunks and switches such that the traffic demands are satisfied and such that a switch load or cost is reduced and (2) a report generator associated with the optimization engine and configured to produce a report containing a modified configuration having the reduced switch load or cost.

In another aspect, the present invention provides a method of reducing switching overhead in a communication network. In one embodiment, the method includes: (1) receiving input data describing trunks, switches and traffic demands in at least a portion of the communication network, (2) arranging connections between the trunks and switches such that the traffic demands are satisfied and such that a switch load or cost is reduced and (3) producing a report containing a modified configuration having said reduced switch load or cost.

In yet another aspect, the present invention provides a web-based server for reducing switching overhead in a communication network. In one embodiment, the server includes: (1) a web server configured to provide an interface to a client for receiving input data describing trunks, switches and traffic demands in at least a portion of the communication network, (2) an optimization engine associated with the web server and configured to receive input data describing trunks, switches and traffic demands in at least a portion of the communication network and arrange connections between the trunks and switches such that the traffic demands are satisfied and such that a switch load or cost is reduced and (3) a report generator associated with the optimization engine and configured to produce a report containing a modified configuration having the reduced switch load or cost.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

As described above, one way for service providers to reduce their costs is through network capacity recovery. The problem of recovering capacity may be advantageously addressed by minimizing the switching overhead incurred by multiple switches in a switching center. A system and method will be introduced herein that address this problem.

Initially developed for Asynchronous Transfer Mode (ATM) switches, the system and method apply flexibly to other devices, such as Synchronous Optical Network (SONET) cross-connects and internet routers. New services enabled by this system and method include: (1) so-called "brown field" reconfiguration of an existing switching center to increase the number of available switch ports, and (2) so-called "green field" design for migrating to new hardware. Given the set of external trunks and the traffic demands between them, the system and method search for a switching center configuration which minimizes the traffic carried on internal trunks. The system and method handle a wide variety of switch types, with hierarchical constraints imposed by components such as interface cards, processor cards, and slots.

The present invention is directed in general to a class of physical configuration optimization that is applicable to capacity deployment and capacity recovery services: optimizing the connectivity between switches within a single switching center. The need for these services arises when network switching centers contain multiple co-located switches. Such switching centers are able to handle more traffic than any individual switch could, but the aggregate capacity is always less than the sum of the individual switch capacities, due to internal switching overhead. To understand the proposed services, it is helpful to consider a simple example.

Figure 1B:
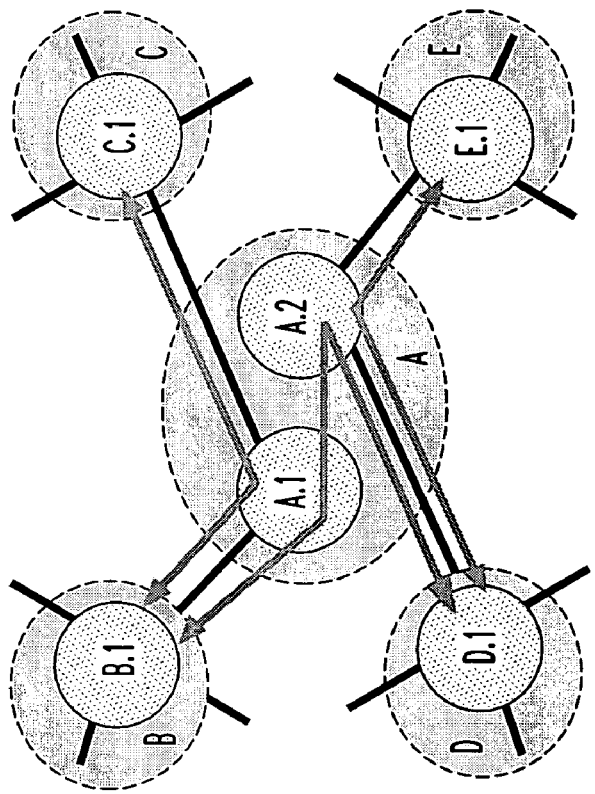
FIGS. 1A and 1B respectively illustrate schematic diagrams of switching center configurations before and after optimization.
Figure 1A:
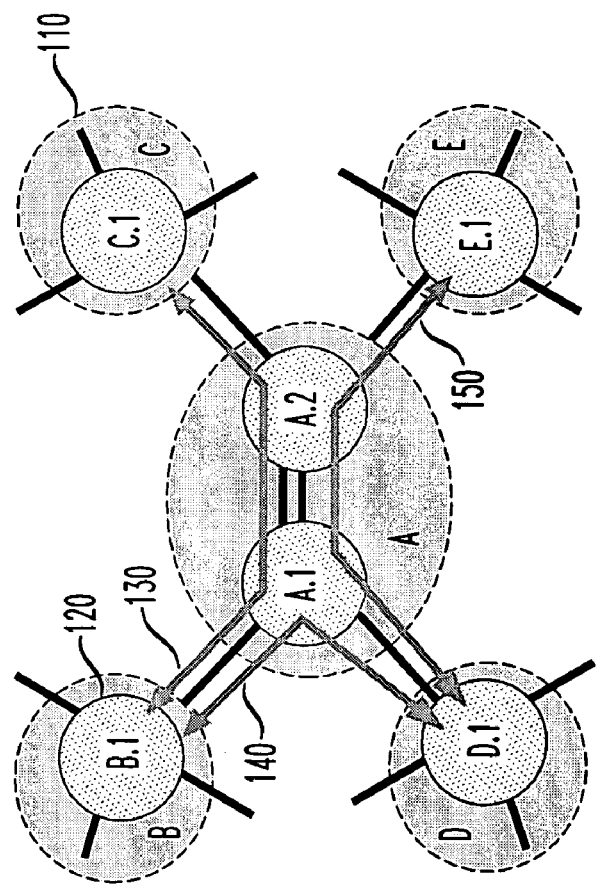

Accordingly, referring initially to FIGS. 1A and 1B, respectively illustrated are schematic diagrams of switching center configurations before optimization (FIG. 1A) and after optimization (FIG. 1B). FIGS. 1A and 1B depict a switching center A connected to four neighboring centers B, C, D and E, under two different physical topologies. Broken-line circles (e.g., a circle 110) represent switching centers, and solid circles (e.g., a circle 120) are switches. Wide arrows (e.g., an arrow 130) represent large traffic flows, while narrow arrows (e.g., an arrow 140) represent a smaller flow. Lines with no arrowheads (e.g., a line 150) represent trunks. In FIG. 1A, switching center A contains two switches, A.1 and A.2, connected to each other by two trunks; these trunks are called "internal trunks" because both endpoints are in the same switching center. The four trunks (A-B, A-C, A-D, A-E) that connect the switches A.1 and A.2 to switches in other switching centers are referred to as "external trunks." Thick arrows represent large aggregate traffic flows between centers B and C, and between centers D and E, which traverse both local switches and use the internal trunks. The narrow arrows represent a smaller aggregate flow between centers B and D that only traverses the switch A.1. In FIG. 1B, the external A-D trunk terminates on the switch A.2 rather than on the switch A.1, and the external A-C trunk terminates on the switch A.1 rather than A.2. In this configuration, the large flows pass through single local switches, and only the narrow flow must pass through both the switches A.1 and A.2. The net effect is a reduction of load on the switches A.1 and A.2, reduced traffic between the switches A.1 and A.2, and the ability to remove one of the internal trunks. Other benefits could include a reduction in end-to-end average delay.

In a true switching center, the situation tends to be much more complicated. Several switches of different types may be terminating dozens of external trunks carrying thousands of flows with varying quality of service classes. The present invention introduces a switching center optimization system and method for solving problems of this type. Depending on the service, the optimization can be used to make an existing switching center more efficient, to deploy an efficient switching center in the first place, or to explore the consequences of different switch designs.

Figure 2:
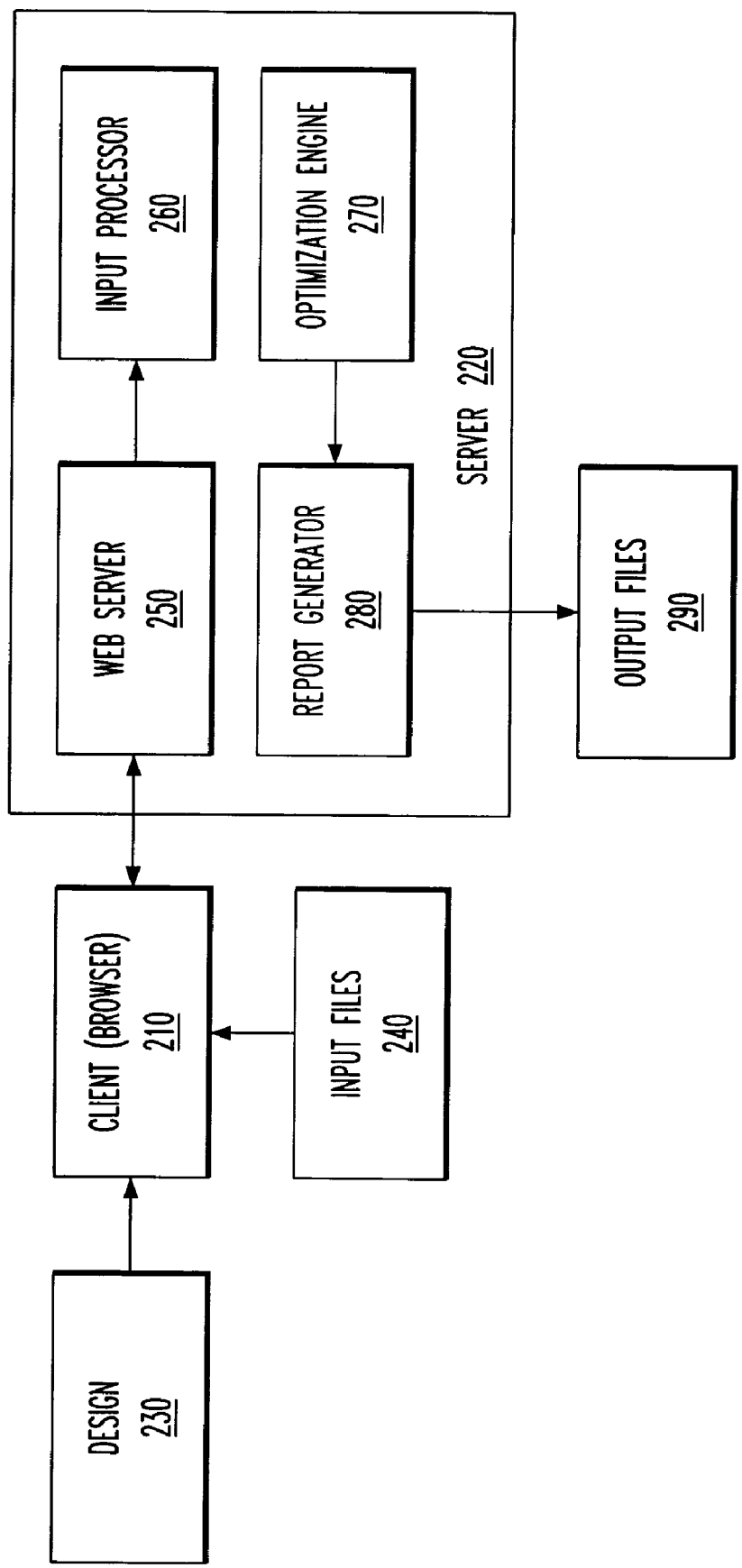
FIG. 2 illustrates a schematic diagram of one embodiment of a system for reducing switching overhead in a communication network constructed according to the principles of the present invention.

Having described switching center configurations, examples of how a system constructed according to the principles of the present invention can be used to support capacity deployment services and capacity recovery applications will now be set forth. Accordingly, turning now to FIG. 2, illustrated is a schematic diagram of one embodiment of a system for reducing switching overhead in a CO of a communication network constructed according to the principles of the present invention.

One advantageous embodiment of the present invention takes the form of a web-based, client-server system to address the problem of switching center configuration optimization. For this reason, FIG. 2 shows the system in this form. A client 210 (typically a personal computer executing a web browser) gains access to a server 220 to perform an optimization service according to the teachings of the present invention. The illustrated embodiment of the client 210 commissions the server 220 to perform analyses and optimization by providing a CO design 230 and/or input files 240 to the server 220.

The server 220 includes a web server 250 configured to provide an interface to the client 210. An input processor 260 is coupled to the web server and is configured to receive, parse and validate input data, placing it in proper form for analysis. Common gateway interface (CGI)-driven Perl language scripts may be employed to associate the input processor 260 to the web server 250.

An optimization engine 270 is coupled to the input processor 260 to receive the input data so placed in proper form. In the illustrated embodiment, the optimization engine 270 performs the core optimization processes described herein. The optimization engine 270 may use a local search heuristic to try to minimize the total traffic on internal trunks, or equivalently, to minimize the total switching load. The optimization engine 270 may also compute the hardware costs associated with any configuration and choose the least cost solution among candidates produced by the optimization engine 270.

A report generator 280 is coupled to the optimization engine 270 and the web server 250 (perhaps by way of CGI-driven Perl language scripts). The report generator 280 is configured to generate reports based on the outcome of analyses performed by the optimization engine 270. These reports may take the form of data passed through the web server 250 back to the client 210 or output files 290 that may be electronically mailed or otherwise communicated or disseminated.

As described above, in the illustrated embodiment, the optimization engine 270 is capable of performing two types of optimization: (1) green field design, to design a new switching center and (2) brown field design, to perform reoptimization of an existing center. Apart from specifying the optimization, the client 210 allows the user to upload input data files 240, and to browse and download optimized configurations. For a green field design, the illustrated embodiment of the system requires two input files: a switch specification file and a demand file. In case of reoptimization, an additional input file, a current configuration file specifying the existing switch configuration, is needed. The illustrated embodiment of the system produces outputs in three files: a summary file, a flows file and a final configuration file. In the illustrated embodiment, all input and output files are text-based and will now be described.

The exemplary embodiment of the switch specification file is used to define the types of switch available in the switching center and how they may be used. Specifically, the switch specification file defines a hierarchical model of the switch components including slots, processor cards, and physical interface cards. The file describes the capabilities of each component, how various components may be combined, and gives a cost for each component. The system then uses this information to infer which interfaces are supported by the switch, what combinations of interface ports are possible, and the minimal cost required to support a particular combination of ports.

Rather than requiring an explicit description of the set of valid combinations of ports, the system uses a hierarchical model to implicitly define this set. At the bottom of the hierarchy are physical interface cards (PICs). Each interface card contains a fixed number of ports of a single interface type.

At the next level are processor cards (PCs). Each processor card can service one or more physical interface cards from a specified set. Each card has a fixed limit on the total number of PICs it can take, as well as a limit on the total transmission rate of all ports connected to it. At the top level, the switch has a number of slots. Each slot can accept processor cards from a given set, up to a specified maximum number of cards. Although the explicit constraint sets can be quite complicated, the information needed for the model is simple and usually readily available. Because the exemplary model employed by the exemplary system relates to the actual architecture of most switches, it is flexible enough to apply for a wide range of switch types.

Table 1 illustrates an exemplary format of a switch specification file.

TABLE 1

Exemplary Format of Switch Specification File

```
Object   User_Defined_Interface
     {<InterfaceName   string >}+
end
Object      SWITCH
<Vendor            string>
<SwitchName       string>
<Capacity real>
<SwitchCost       real>
<NumSlots integer>
<LoadFactor       real>
Object      PIC
{<PIC Label PIC_ID      NumberOfPorts      CapPerPort     Cost>}+
end
Object      PC
{<PC Label     PC_ID      MaxNumPICs      PICAllowed
MaxProcessingCapacity Cost>}+
end
Object      SLOT
{<SLOT_Label     SLOT_ID      MaxNumPCs      PCAllowed      Cost>}+
End
```

The exemplary embodiment of the switch specification file has an optional User_Defined_Interface object, followed by one or more SWITCH objects. Each SWITCH object has a basic switch information section followed by a PIC object, a PC object and a SLOT object. Each line of the PIC object defines a different type of physical interface card, including the interface type, number of ports, cost for each card. Similarly, the PC object defines the parameters of each PC types. The SLOT objects includes one line for each slot instance; multiple slot instances may be of the same type (i.e., have the same parameters.)

A number of common generic interface types and their corresponding transmission rates are predefined in the illustrated embodiment of the system (e.g., OC12 and 622 Mbps). Any others that are needed may be defined in the User_Defined_Interface object, which contains a list of name-value pairs defining interface types.

Elsewhere in the data files, each switch port and each trunk is labeled with a pre-defined or user-defined interface type, and during the optimization, trunks can only be assigned to ports with a matching interface type. The user-defined interfaces are useful for defining trunk assignment constraints other than those implied by transmission rate. For example, short-range and long-range optical interfaces of a particular rate can be distinguished by the names such as STM-16-short and STM-16-long. User-defined interfaces are useful on switches which handle multiple protocols. For example, it may be necessary to distinguish between native ATM ports and frame relay ports on an ATM switch.

The demand file is used to list the flows that pass through or terminate in a given switching center, and to specify which external trunks they are routed on. For each flow, the demand file identifies a source trunk, a destination trunk, and a bandwidth. Multiple flows with identical parameters can be included on one line using a count field.

The demand file also defines the trunks for the switching center, which fall into three categories. External trunks are those which carry traffic to and from remote switching centers, internal trunks connect two switches within the local switching center, and access trunks are used to connect locally terminating flows with local terminating equipment not considered to be part of the switching center. Each trunk has an interface type and a fill-factor. The fill-factor is a multiplier, for example a number between 0.0 and 1.0, applied to the trunk capacity, specifying the maximum fraction of the capacity which can be placed on the trunk during optimization.

The exemplary embodiment of the current configuration file contains a description of the existing switch configurations and is used as the starting point for the brown field optimization runs. The current configuration file contains an explicit list of all of the equipment in use, including switches, slots, processor cards, physical interface cards and trunks. In addition, the current configuration file specifies how all of the pieces are connected to each other. The seven sections in the exemplary current configuration file are shown in Table 2, below.

TABLE 2

Exemplary Format of Current Configuration File

\# SWITCH id description
{<SWITCH_ID   Type>}+
\# SLOT configuration description
{<SLOT_ID   Type>}+
\# PC configuration description TABLE 2-continued Exemplary Format of Current Configuration File {<PC_ID   Type>}+
\# PIC configuration description
{<PIC_ID   Type>}+
\# External Trunk (E-Trunks) configurations
{<TRUNK_ID   Type Port_ID Fill_Factor>}+
\# Access Trunk (A-Trunks) configurations
{<TRUNK_ID   Type Port ID Fill_Factor>}+
\# Internal Trunk ([-Trunks) configurations
{<TRUNK_ID   Type Port_ID_1 Port_ID_2 Fill_Factor>}+

Each component is described by an identifier and a type. The type is a reference to the different object types defined in the switch specification file, above. The identifier uniquely specifies each component and its relationship to other components. For example, S0 refers to a particular switch, S0.1 refers to the first slot on that switch, S0.1.2 is the second PC on S0.1, and so on. The trunks are described using additional information such as ports to which they are connected and their fill factor. For example, an external trunk E1 connected to port id S0.1.2.3.4 denotes that it is connect to port 4 on PIC 3 plugged into PC 2 on slot 1 of switch S0. It should be noted that each internal trunk uses a switch port on two local switches while the external and access trunks use only one local port. The same format is used to describe the state of the system after optimization, in the final configuration file.

At the end of a run, the illustrated embodiment of the system produces outputs in three different files. A high-level summary of the design is produced in a summary file. The summary file includes information such as the number of switches needed for the final configuration and their type, the number of external, access and internal trunks, ports needed on each switch, a list of PCs, PICs and slots required, cost information, aggregate load on switches and statistics on switch overhead. The exemplary final configuration file, whose format is same as that of the current configuration file, is generated to give detailed information about how various elements on each switch should be configured. The flows file is the third output file generated by the system; its exemplary format is similar to the demand file. However, the flows file also specifies a route that each flow should take through the switching center. The route is specified by listing, in order, all of the switches and trunks that the flow passes through.

The problem faced in switching center optimization is essentially a partitioning problem. Given a particular set of external trunks the goal is to form clusters of trunks such that the amount of traffic between clusters is small. Each cluster is then assigned to a different switch, so that a large amount of traffic needs only visit a single switch in the switching center. The problem can be based on the min k-cut problem. In the min k-cut problem, a graph has several vertices (external trunks) connected by edges, and each edge has a non-negative weight (the amount of traffic between corresponding trunks). The goal is to divide the graph into k disjoint clusters while minimizing the weight of inter-cluster edges (i.e., minimizing traffic on internal trunks). For fixed k, the optimal solutions can be found in polynomial time, and there is a fairly simple 2-approximation (Goldschmidt, et al., supra, and Saran, et al., supra). The key distinction in switching center optimization is that there are complex constraints specifying which combinations of vertices can fit into the same cluster. These constraints include switch capacity constraints as well as configuration constraints implied by the hierarchy of switch components.

Given a particular set of switches, the problem may be formulated as an integer program, and in principal solved to optimality. When individual flows are small relative to the trunk size, some of the integer variables can be relaxed to take continuous values. Even so, this particular approach does not scale well to problems with several switches and tens to hundreds of external trunks.

The present invention introduces a system that instead uses a heuristic technique used to approach large graph partitioning problems in which there are simple limits on the number of vertices in each cluster. In its simplest form, the algorithm involves sequentially swapping pairs of vertices between clusters, choosing at each step the pair of vertices that produces the maximum benefit.

The algorithm also makes a sequence of incremental perturbations, choosing in each step to swap a pair of external trunks or transfer a single external trunk from one switch to another. It is relatively straightforward to compute the benefit of each such perturbation, but relatively difficult to determine if a given perturbation satisfies all switch constraints. It is desirable, in making the algorithm scalable, to make this determination as fast as possible. This involves pre-processing the hierarchical switch constraints to extract relatively simple approximate constraints to be used in interior loops.

For a switch that accepts N types of trunks, the number of trunks of each type assigned to the switch can be represented by an integer vector of length N, which is referred to as a "reduced state vector." In the pre-processing step, linear inequalities that must be satisfied by every reduced state vector representing a feasible switch configuration can be determined. In performing a feasibility check, such as in a feasibility checking step 440 of FIG. 4 (described below), any reduced state vector that does not satisfy said linear inequality can be rejected up front as infeasible. This reduces the time required for step 440, which may be executed many times.

In one embodiment of the present invention, the linear inequalities may be derived by a projective process. Here, an integer vector of length M, with M>N, is used to describe a switch configuration in detail. This vector is referred to as a "detailed state vector." The detailed state vector may specify, for example, the number of trunks of each type assigned to each switch component, such as a PIC, PC or slot. A reduced state vector may be derived from a detailed state vector by a linear transformation. Given the data provided in the switch configuration file, it is straightforward for those skilled in the pertinent art to define linear inequalities that are satisfied by detailed state vectors representing valid switch configurations. Using a projective process, linear inequalities applicable to reduced state vectors may be derived from the linear inequalities which apply to detailed state vectors. The new set of inequalities may then be used repeatedly in, e.g., the step 440. Those skilled in the pertinent art commonly refer to the projective process as "finding the projection of a convex polytope under a linear transformation" (see, e.g., Jones, et al., "Equality Set Projection: A new algorithm for the projection of convex polytopes in half-space representation", Dept. Engineering, Cambridge University, Technical Report CUED/F-INFENG/TR.463, incorporated herein by reference).

As with any greedy algorithm, the core optimization algorithm is prone to becoming trapped in local minima. This tendency is mitigated by initializing the algorithm with multiple arbitrary starting points and taking the best of the results obtained.

Table 3 sets forth exemplary pseudo-code for one embodiment of an optimization algorithm employable within the system.

TABLE 3

Exemplary Switch Configuration Optimization Algorithm

```
optimize_configuration (design, demand, switch_spec,
current_config) {
    gain = 0;
    if (design == brown_field) then {
        C_i = current_config;
        (cost, best_C) = improve_config(C_i);
    }
    else { /* Green field design */
        cost = infinity;
        do
            C_i = gen_arbitrary config(switch_spec, demand);
            (t_cost, t_C) = improve_config(C_i);
            if (t_cost <= cost) then {
                cost = t_cost;
                best_C = t_C;
            }
        until (term_condition) ;
    }
    gen_reports(cost, best_C);
}
sub improve_config(CC) {
    do
        no_further_improvement = 1;
        T = gen trades (CC);
        for each S_i in T { U_i = compute_gain(S_i); }
        sort (U_i, S_i) in order of decreasing U_i;
        for each U_i such that U_i>0 {
            if feasible(S_j) then {
                CC = apply_trade(CC,S_i);
                no_further_improvement = 0;
                break;    /* to beginning of do..until */
            }
        }
    until (no_further_improvement);
    return(cost_config(CC),CC);
}
```

The core of the exemplary switch configuration optimization algorithm of Table 3 is a local optimization subroutine improve_config( ). This subroutine takes a switching center configuration as input, generates a set of candidate perturbations of the configuration and computes the improvement that results from each perturbation. Improvement is measured in terms of a reduction in switching load or cost. The feasibility of perturbations is checked in order of decreasing benefit, and the first feasible perturbation is applied to create an improved configuration. The process of generating and evaluating perturbations continues until no feasible and beneficial perturbation is found, at which point the improve_config( ) subroutine returns the improved configuration and its cost. Depending on the user's preference, the cost can be the switch load or the cost of the configuration. The overall algorithm is embodied in an optimize_configuration( ) routine, which controls the optimization process based on the design choice selected by the user. In case of brown field design (improving an existing design), the existing switching center configuration is used as the starting point for the improve_config( ) subroutine. In the case of a green field design, arbitrary initial designs generated by a gen_arbitrary_config( ) routine are fed into the improve_config( ) subroutine. The best configuration seen so far and its cost are updated after each call to improve_config( ). The algorithm halts when a terminal condition is reached: either the total number of iterations exceeds a limit or the number of successive iterations without improving the best solution exceeds a limit. The gen_arbitrary_config( ) routine begins with a single switch and attempts to assign all trunks to it. If this fails, additional switches are added one at a time, and all external trunks are arbitrarily divided between the switches, in proportion to the switch capacity. The process of adding switches and assigning external trunks continues until a feasible initial assignment is found.

Figure 3:
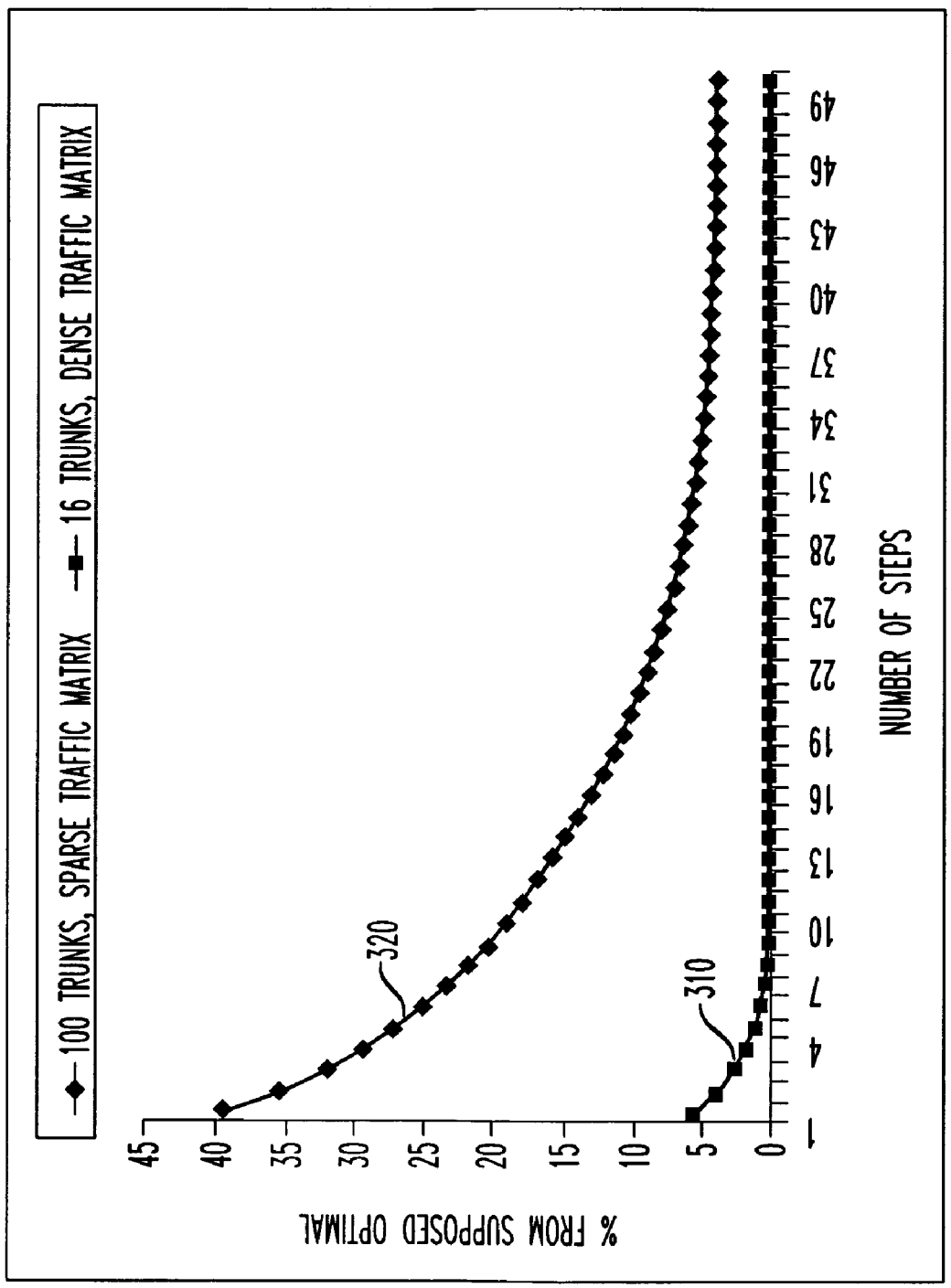
FIG. 3 illustrates a graphical representation of progress toward optimization by the system of FIG. 2.

The degree of optimization obtained and the number of iterations required can vary greatly from one scenario to another. Results from two representative scenarios are shown in FIG. 3. The first scenario (a line 310) involves ATM switches connecting 16 external trunks under a dense but non-uniform traffic matrix derived from a proposed national network design. The second scenario (a line 320) involves optical cross connects connecting over 100 trunks, using a sparse traffic matrix taken from an existing switching center. In each scenario, the improve_config( ) subroutine was run using 80 arbitrarily generated initial conditions. The total switching load was recorded after each perturbation step to obtain an improvement profile for each run. The lowest switching load observed in 80 trials is referred to as the supposed optimal. FIG. 3 shows the average switching load observed in each step, expressed as percentage excess relative to the supposed optimal. The ATM scenario (the line 310) improves by about 5%, coming very close to the supposed optimal on average within 10 perturbation steps. In the optical scenario (the line 320), the excess is reduced from 40% to 5% on average. The number of perturbations required is much larger, simply because the number of trunks is large. Generally speaking, the difference between arbitrary and optimal designs is largest when the trunk traffic matrices are sparse, and is lowest when the traffic matrices are relatively uniform.

In capacity deployment scenarios, internal overheads or constraints are sometimes overlooked in the initial design phase, resulting in unrealistic switching center designs. In later design phases, in the absence of a switching center optimization system, a tendency exists to over-engineer the switching center.

Although capacity recovery services have some principles in common with capacity deployment, they are also different in a number of ways. The most salient difference is that capacity recovery operates on an existing network carrying live traffic; thus the adage, "first, do no harm," applies. Secondly, the benefit of the capacity recovery is limited by the degree to which the existing network is inefficient.

For the service to be beneficial, the costs of reconfiguration should to be small relative to the expected benefits. For this reason, capacity recovery services are usually targeted at the logical layer of the network. Examples include adapting optical layer wavelengths to match IP layer demands (Acharya, et al., "Architecting Self-Tuning Optical Networks", European Conference on Optical Communications (ECOC), Copenhagen, September 2002, incorporated herein by reference) or rerouting virtual circuits to relieve bottlenecks in ATM networks (Asghar, et al., "iOptimize: A Service for analyzing and optimizing connection oriented data networks in real time", Bell Labs Tech. J., incorporated herein by reference).

Switching center optimization is an exceptional case in which it can be cost effective to change the physical configuration, because the affected switches and trunk terminations all share the same physical location. Another particular feature of capacity recovery is that the service must include an incremental series of steps to get from the existing configuration to the desired configuration. Because of the need to keep costs low, the number of steps and complexity of each step must be kept reasonably small. A fourth important feature of capacity recovery is the need to obtain accurate data about the existing network. Network inventory services enable and can be motivated by capacity recovery services.

Regardless of the type of network involved, a capacity recovery service based on switching center reconfiguration would advantageously be performed in the four basic processes listed below. The nature of the work involved in each process could vary depending on the underlying technology.

Data Collection: The purpose of the data collection process is to gather an accurate picture of the current state of the switching center. This includes an inventory of the relevant switching center hardware such as switches, processor cards, interface cards, and cables. The capabilities of each switch must be described in a switch configuration file. The internal and external trunks need to be identified. It is also important to list all flows traversing the center, identify the local route of each flow, and determine the capacity used by each flow.

The definition of a flow and the difficulty of each of these items will vary depending on the underlying technology and on the network management system. For example, in a SONET/Synchronous Digital Hierarchy (SONET/SDH) network, a flow is a circuit. The capacity used by the flow is known and fixed, regardless of the amount of data actually on the circuit. In an ATM network, a flow is a permanent virtual connection (PVC), which may belong to one of several service categories. For a connection in the constant-bit rate (CBR) category, the capacity is given, but this is not the case for a connection in the unspecified bit rate (UBR) category. In practice, the vast majority of ATM connections fall into the UBR category, and hence the data collection in an ATM network must include a method for estimating the traffic load on groups of UBR connections. One such method was developed for the work described in Asghar, et al., supra.

Analysis: The first step in the analysis process is to choose metrics which will be used to compare the benefits obtained by proposed changes. Some natural metrics for switching center optimization include the capital costs (e.g., of switches and interfaces), operating costs (e.g., power and footprint), and system load (e.g., switching capacity consumed, number of occupied ports). Next, optimization techniques are used to identify new physical topologies which are close to the existing configuration and which have improved performance under the chosen metrics. Currently, the system uses switching capacity consumed as an optimization metric; many of the other performance metrics are correlated with switching capacity. The system may also produce a sequence of steps that may be used to transition to the new configuration. The third analysis step includes estimating the cost and effort required to perform each transition step and comparing these cost and effort with the resulting benefits. The transition cost includes tangibles such as time and labor as well as intangible elements, such as the risk of network disruption. In the end, the analysis either produces a sequence of beneficial transition steps or concludes that no reconfiguration is warranted.

Transition: Network technicians at the switching center undertake a well-defined sequence of steps to rearrange the switch connectivity at the switching center, normally without interrupting the processing of the live traffic. At the physical level, the rearrangements involve unplugging external trunks from ports on a given switch and installing them on ports of another switch, as well as adding or removing internal trunks. In the network management system, the operator should switch all of the flows on the affected trunk to alternate routes. Once the trunk has been moved and advertised to the network management system, a set of flows can be routed back onto the trunk. The number of flows moved in each step can be very large. In ATM networks, for example, there may be tens of thousands of connections on a given trunk. For this reason, and to avoid errors, automated tools for moving connections are required.

Evaluation: The final process is to quantify the results of the reconfiguration. The data collection procedures are repeated to determine the new network state, and performance metrics are recomputed and compared with the initial and predicted values. For example, the evaluation process may confirm that certain switch ports have been freed, that the switch loads have been reduced by a given amount, and that congestion or other undesirable conditions have not been introduced.

Although the above discussion has been directed to optimizing a single switching center, it would clearly be possible to take the entire network into account, and to use a model which allows global rerouting of flows as well as switching center reconfiguration. In fact, optimization of an entire network falls within the broad scope of the present invention.

Consider for example the network reconfiguration illustrated in FIG. 1, and assume that all flows initially used least-weight routing in the network depicted on the left side. Suppose also that the weight of each link has a fixed component in addition to any distance-based component. In other words, internal links have a non-negligible weight based on the real costs of the switch ports they use. Under the new configuration, the cost of routes traversing an internal link at center A increased. However, it may be possible to move the flows onto a new route not involving switching center A. It is assumed that the cost of the new route is less than the new route (B.1,A.1,A.2,D.1) though necessarily still greater than the cost of the original (B.1,A.1,D.1). Conversely, some flows which originally did not use switching center A may now find it advantageous to do so because of the reduced cost of the path (B.1,A.1,C.1) relative to the original cost of the path (B.1,A.1,A.2,C.1). The overall effect in this example is that the match of the traffic to the physical configuration is further increased.

One scalable approach to switching center optimization in a network context would be to alternate local switching center optimization steps with global rerouting steps. In the first step, current routing information provides the input data for improving the configuration of a single switching center. In the second step, the routing is improved to take advantage of the new configuration.

The two steps are iterated, potentially alternating between a set of different switching centers, until no further improvement is possible. Convergence can be assured by requiring that a single metric (e.g., the total load on all network switches) is improved at each step. Note that the iteration procedure should advantageously be used directly in the analysis phase. In the transition phase, the goal would be to move to the final solution as economically as possible, without necessarily visiting the intermediate stages generated by the analysis.

Figure 4:
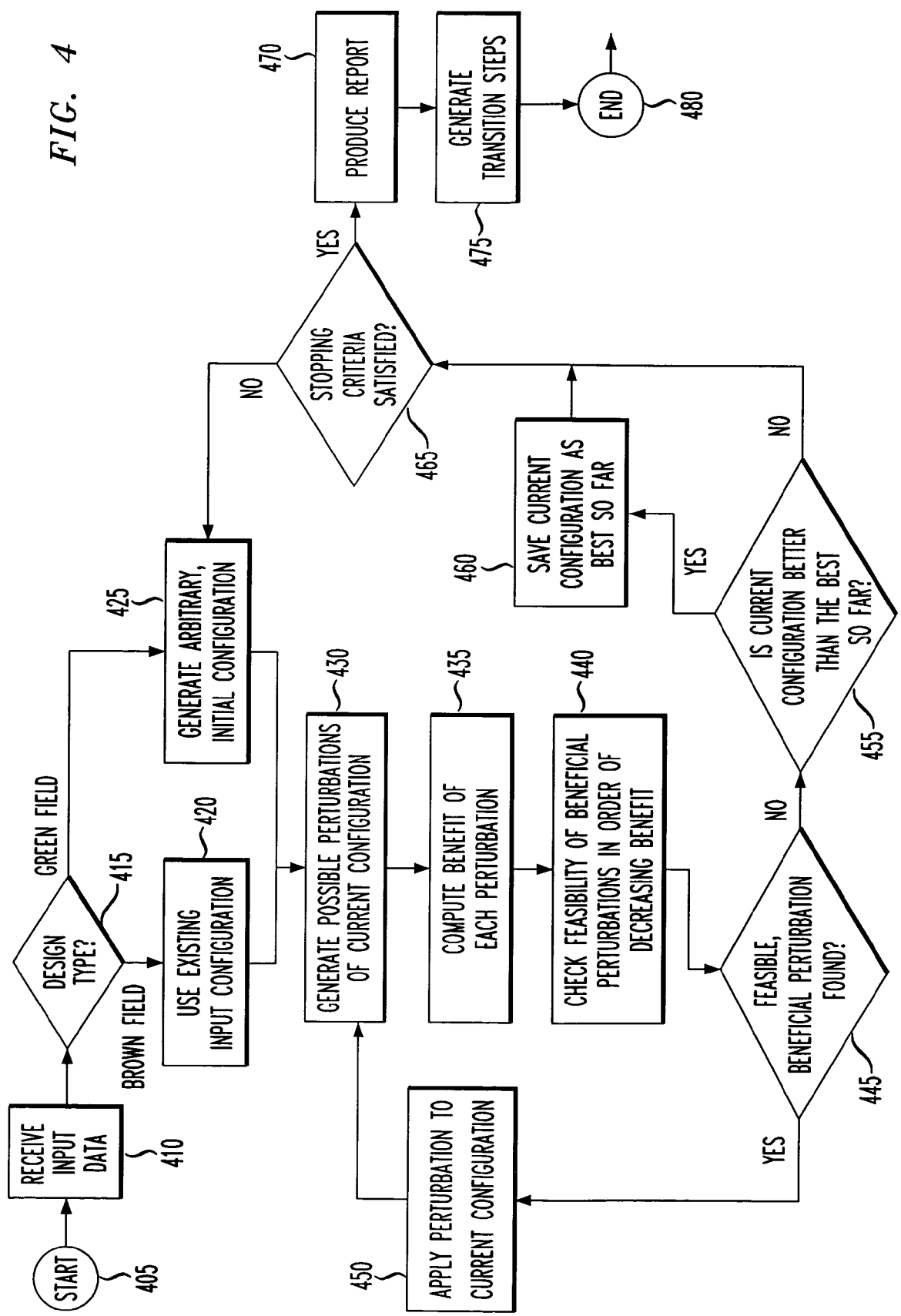
FIG. 4 illustrates a flow diagram of one embodiment of a method for reducing switching overhead in a communication network carried out according to the principles of the present invention.

Turning now to FIG. 4, illustrated is a flow diagram of one embodiment of a method for reducing switching overhead in a communication network carried out according to the principles of the present invention. The method begins in a start step 405 wherein it is desired to reduce, and ideally optimize, switching overhead in at least a portion of a communication network. In a step 410, input data describing trunks, switches and traffic demands in at least a portion of the communication network is received. The input data may be provided by a client, perhaps over the Internet. The input data may have originated in a design for a new CO or communication network or a configuration for an existing CO or communication network. Accordingly, in a decisional step 415, it is determined whether the communication network or portion thereof to be improved is a brown field (existing) design or a green field (new) design. The input data may have originated in one or more input files, perhaps having a format as described above.

In the case of a brown field design, a step 420 calls for an existing input configuration to be used. In the case of a green field design, a step 425 calls for an arbitrary configuration to be generated and used as an input configuration.

Irrespective of whether the step 420 or the step 425 is performed, the method then calls for a core sequence of optimization steps to be performed. In a step 430, possible perturbations of the current (e.g., initial) configuration are generated. Next, in a step 435, the benefit of each perturbation is computed. Then, in a step 440, the feasibility of beneficial perturbations are checked in order of decreasing benefit.

Then, in a decisional step 445, it is determined whether a feasible, beneficial perturbation has been found. If YES, a step 450 calls for the feasible, beneficial perturbation to be applied to the current configuration, at which point the sequence of steps 430, 435, 440 is again performed. If NO, a decisional step 455 determines whether the current configuration is better than the best so far. If YES, the current configuration is saved as being the best so far in a step 460 and the method continues to a decisional step 465 in which it is determined whether stopping criteria (e.g., a particular design goal has been met) are satisfied. Looking back at the decisional step 455, if the current configuration is not better than the best so far, the step 460 is bypassed, and the decisional step 465 is next performed.

If the design is of the green field type and the stopping criteria are not met, the method returns to the step 425 in which another arbitrary, initial configuration is generated and improved over successive iterations. If the stopping criteria are met, a report is produced in a step 470. The configuration contained in the report may be a final configuration as described above. In one embodiment, the report is delivered to a client via the Internet. The report may alternatively or additionally be printed out or provided in one or more output files.

In one embodiment, the method includes a step 475 in which transition steps for transitioning to the configuration are generated. Like the report, the transition steps may be delivered to a client via the Internet. The report may alternatively or additionally be printed out or provided in one or more output files. The method ends in an end step 480.

Although the present invention has been described in detail, those skilled in the art should understand that they can make various changes, substitutions and alterations herein without departing from the spirit and scope of the invention in its broadest form.

What is claimed is:

1. A method of configuring a switching center, comprising:
   requesting types of switches in the switching center, each type being defined by a set of numbers, each number of a given set defining quantities of an associated type of slot on the switch associated with the given set, a given type of slot determining quantities and varieties of processor cards (PCs) connectable to the given type of slot;
   requesting the types of trunk lines to be connected in the switching center and the amounts of traffic to be transmitted between pairs of the trunk lines; and
   then finding a configuration for connecting the trunk lines to the switches based on the requested types of switches.

2. The method as recited in claim 1 further comprising requesting the types of physical interface cards (PICs) to be connected to the PCs, the finding a configuration being also based on the types of PICs.

3. The method as recited in claim 1 wherein the finding comprises determining a value of an overhead for each of a plurality of connection configurations, the overhead being related to the communication bandwidth associated with transmitting data between the switches.

4. The method as recited in claim 1 wherein the finding includes simulating transfers of a trunk connection from one switch to another, or swapping connections of pairs of the trunks between the switches and determining whether the transfers or swaps lower an overhead associated with communications between different ones of the switches.

5. The method as recited in claim 3 wherein the determining further comprises:

selecting a plurality of trunk connection configurations that differ from each other by finite numbers of moves of trunk connections on the switches; and deciding whether to accept or reject one of the trunk connection configurations based on whether a linear function of the numbers of physical interface card (PIC) ports for the one of the configurations satisfies an inequality.

6. The method as recited in claim 5 wherein the linear function is computed via a projective process.

* * * * *